United States Patent
Mramor

[11] Patent Number: 5,826,913
[45] Date of Patent: Oct. 27, 1998

[54] AIR BAG WITH RETAINING RING

[75] Inventor: Vincent J. Mramor, Chandler, Ariz.

[73] Assignee: TRW Inc., Lyndhurst, Ohio

[21] Appl. No.: 740,263

[22] Filed: Oct. 25, 1996

[51] Int. Cl.$^6$ .................................................... B60R 21/16
[52] U.S. Cl. ...................................... 280/728.2; 280/731
[58] Field of Search ................................ 280/728.2, 731, 280/732, 743.1

[56] References Cited

U.S. PATENT DOCUMENTS

| | | | |
|---|---|---|---|
| 4,986,569 | 1/1991 | Brunton | 280/728.2 |
| 5,074,585 | 12/1991 | Satoh | 280/728.2 |
| 5,152,549 | 10/1992 | Aird | 280/728.2 |
| 5,242,191 | 9/1993 | Faigle et al. | 280/731 |
| 5,421,607 | 6/1995 | Gordon | 280/728.2 |
| 5,505,489 | 4/1996 | Bollaert et al. | 280/743.1 |
| 5,607,179 | 3/1997 | Lenart et al. | 280/728.2 |

*Primary Examiner*—Kenneth R. Rice
*Attorney, Agent, or Firm*—Tarolli, Sundheim, Covell, Tummino & Szabo

[57] ABSTRACT

A vehicle safety apparatus (10) for use with an inflation fluid source (16) includes an air bag (14) having a mouth portion (90) and having a body portion (100) extending from the mouth portion. The mouth portion (90) has a first opening (94). A retaining ring (22) for connecting the air bag (14) with the inflation fluid source (16) has a second opening (72). The air bag (14) and the retaining ring (22) have a first condition with the retaining ring disposed inside the air bag. The air bag (14) and the retaining ring (22) have a second condition in which the body portion (100) of the air bag is inverted and extends through the first opening (94) in the mouth portion (90). The mouth portion (90) of the air bag (14) is wrapped around the retaining ring (22) and extends through the second opening (72) in the retaining ring. In assembly of the vehicle safety apparatus (10), the retaining ring (22) is moved through the first opening (94) from a position outside the air bag (14) to a position inside the air bag. The body portion (100) of the air bag (14) is then inverted by pulling the body portion through the first opening (94) in the mouth portion (90).

16 Claims, 3 Drawing Sheets

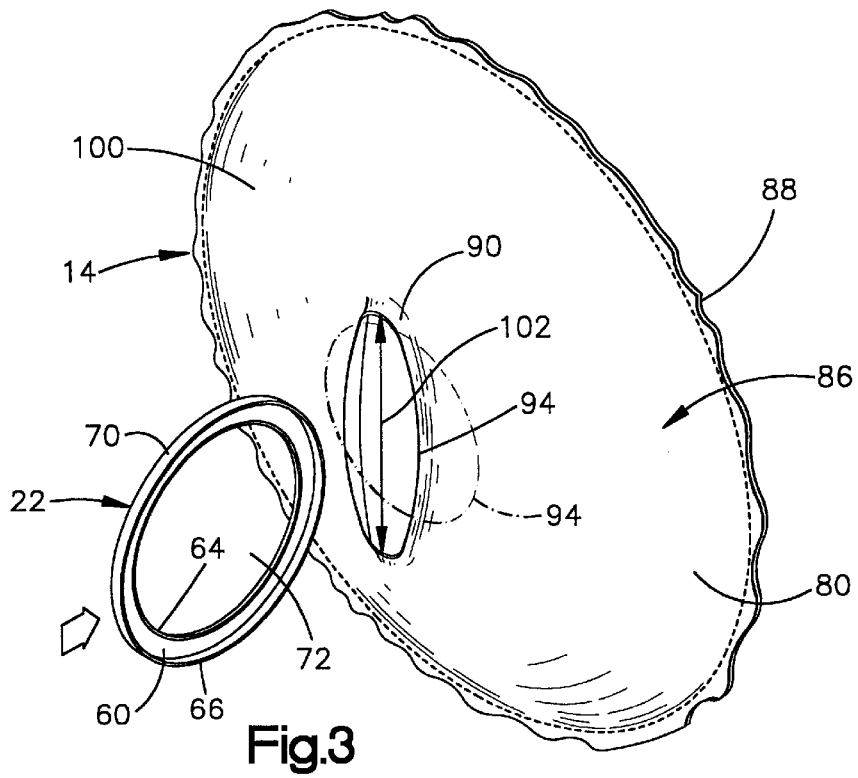
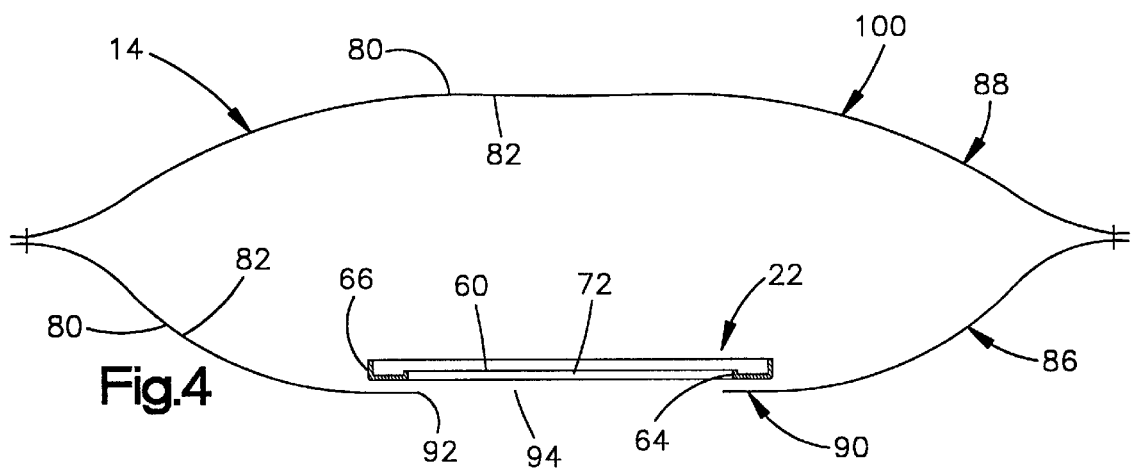
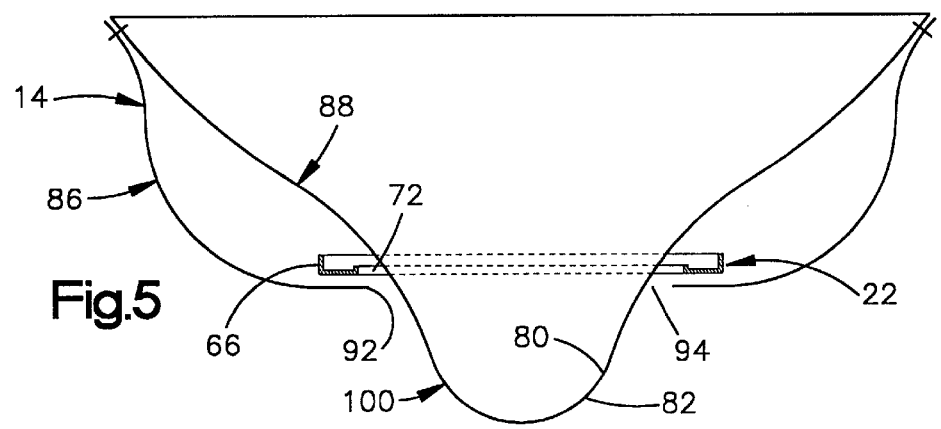

AIR BAG WITH RETAINING RING

BACKGROUND OF THE INVENTION

1. Technical Field

The present invention relates to a vehicle safety apparatus including an inflatable vehicle occupant protection device. In particular, the present invention relates to an air bag module including a retaining ring for maintaining an air bag in position during inflation of the air bag.

2. Description of the Prior Art

It is known to help protect a vehicle occupant by an air bag that is inflated in the event of sudden vehicle deceleration such as occurs in a vehicle collision. The air bag is inflated by inflation fluid from an inflator. The inflation fluid flowing into the air bag exerts a force on the air bag to inflate the air bag in a direction away from the inflator. A throat or mouth portion of the air bag is held in position relative to the inflator by a retaining ring. The air bag is typically folded around the retaining ring so that two portions of the air bag overlie each other. The overlying portions of the air bag are then sewn together to secure the air bag to the retaining ring.

SUMMARY OF THE INVENTION

The present invention is a vehicle safety apparatus for use with an inflation fluid source. The apparatus comprises an inflatable vehicle occupant protection device having a mouth portion and having a body portion extending from the mouth portion. The mouth portion has a first opening. A retaining ring for connecting the inflatable device with the inflation fluid source has a second opening. The inflatable device and the retaining ring have a first condition with the retaining ring disposed inside the inflatable device. The inflatable device and the retaining ring have a second condition in which the body portion of the inflatable device is inverted and extends through the first opening in the mouth portion. The mouth portion is wrapped around the retaining ring and extends through the second opening in the retaining ring.

The present invention is also a method of assembling a vehicle safety apparatus for use with an inflation fluid source. The method includes the step of providing an inflatable vehicle occupant protection device having a mouth portion and having a body portion connected with the mouth portion, the mouth portion of the inflatable device having a first opening. The method also includes the step of providing a retaining ring for connecting the inflatable device with the inflation fluid source, the retaining ring having a second opening. The method also includes the steps of moving the retaining ring through the first opening from a position outside the inflatable device to a position inside the inflatable device, and inverting the body portion of the inflatable device by pulling the body portion through the first opening in the mouth portion. The inverting step includes wrapping the mouth portion of the inflatable device around the retaining ring to extend through the second opening.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a view illustrating a first step in the process of assembling an air bag and retaining ring which form part of the air bag module of FIG. 1;

FIG. 4 is a view illustrating the air bag and retaining ring of FIG. 3 in a partially assembled condition;

FIG. 5 is a view illustrating a further step in the process of assembling the air bag and retaining ring;

DESCRIPTION OF PREFERRED EMBODIMENTS

The present invention relates to a vehicle safety apparatus and, in particular, relates to an apparatus including an inflatable vehicle occupant protection device, such as an air bag, for helping to protect a vehicle occupant. The present invention is applicable to various vehicle safety apparatus constructions. As representative of the present invention, FIGS. 1 and 2 illustrate a vehicle safety apparatus or air bag module 10.

Figure 1:
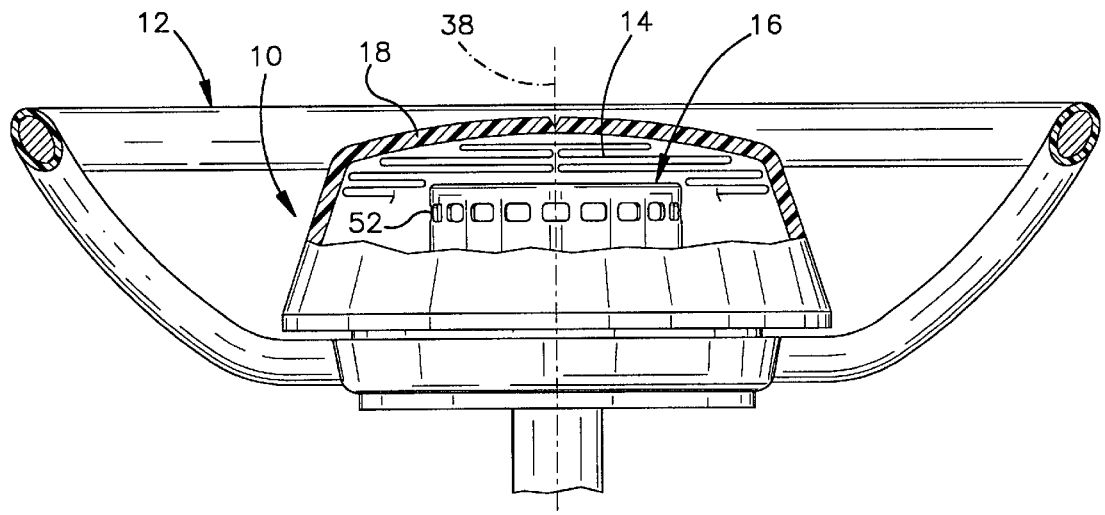
FIG. 1 is a view, partially in section, of a vehicle steering wheel and an air bag module constructed in accordance with the present invention, showing the air bag in a deflated condition.
Figure 2:
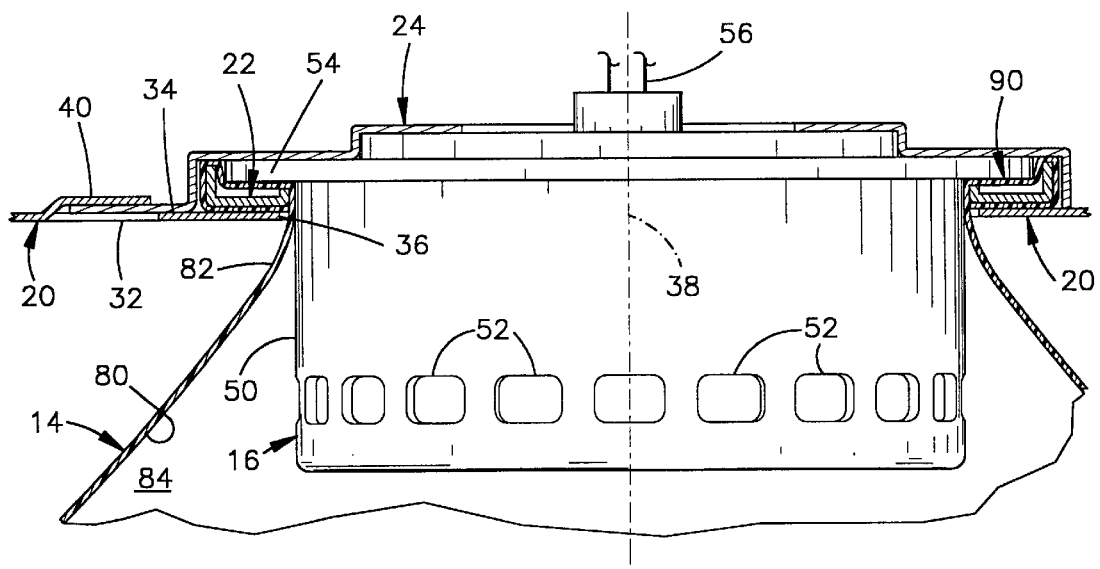
FIG. 2 is an inverted, sectional view of the air bag module of FIG. 1, showing the air bag in an inflated condition.

The air bag module 10 is mounted at the center of a vehicle steering wheel 12 (FIG. 1). The air bag module 10 includes an inflatable vehicle occupant protection device 14, of the type commonly known as an air bag, which is folded and stored with an inflator 16 inside a cover 18. The air bag module 10 also includes a mounting plate 20 (FIG. 2) for securing the module to the steering wheel 12, a retaining ring 22 for retaining the air bag 16 on the mounting plate, and a clamp ring 24 for securing the inflator 16 to the mounting plate.

The mounting plate 20 in the illustrated embodiment is a metal plate formed separately from, and secured to, the vehicle steering wheel 12. It should be understood that a mounting plate can have different configurations. For example, in a vehicle safety apparatus including a passenger side air bag, the mounting plate could be a portion of a housing of an air bag module, a portion of an inflator, or a portion of a vehicle instrument panel.

The mounting plate 20 (FIG. 20) has parallel, radially extending first and second major side surfaces 32 and 34. A circular opening 36 in the mounting plate 20 is centered on an axis 38. A pair of circumferentially spaced mounting tabs, one of which is shown at 40 in FIG. 2, are disposed on the mounting plate 20. Each one of the mounting tabs 40 is spaced apart axially from the adjacent major side surface 34 of the mounting plate 20.

The inflator 16 is illustrated as a driver's side inflator and is a source of inflation fluid for inflating the air bag 14 to protect a driver of the vehicle during vehicle deceleration such as occurs during a collision. It should be understood that the present invention is applicable to vehicle safety apparatus including inflators having different configurations, such as inflators for passenger side air bags or for side impact air bags. For example, the inflator 16 is illustrated as a pyrotechnic inflator which uses the combustion of gas-generating material to generate inflation fluid in the form of gas to inflate the air bag 14. The module 10 alternatively could include an inflator which contains a stored quantity of pressurized inflation fluid, or a combination of pressurized inflation fluid and ignitable material for heating the inflation fluid.

The inflator 16 includes a body portion 50 having a plurality of gas outlet openings 52 for directing inflation fluid into the air bag 14. A mounting flange 54 projects radially outward from the body portion 50 of the inflator 16. A pair of lead wires 56 extend from the inflator 16 and are connected to electric circuitry (not shown) of the vehicle to receive an electric signal to actuate the inflator, in a known manner.

The retaining ring 22 (FIGS. 2, 4 and 7) has an annular configuration and circumscribes the inflator 16. The retaining ring 22 is made from metal and has an U-shaped, cross-sectional configuration. A planar, radially extending body portion 60 (FIG. 7) of the retaining ring 22 has a radially extending outer side surface 62. Inner and outer peripheral flanges 64 and 66 extend axially from the body portion 60 of the retaining ring 22. The outer side surface 62 of the body portion 60 extends between an axially extending side surface 68 of the inner peripheral flange 64 and an axially extending side surface 70 of the outer peripheral flange 66. The side surface 68 of the inner peripheral flange 64 defines a circular central opening 72 of the retaining ring 22. The outer diameter of the retaining ring 22 is many times greater than the axial extent of the flanges 64 and 66 so that the retaining ring has an overall substantially planar configuration.

The air bag 14 (FIGS. 3 and 4) is made from a fabric material, such as woven nylon. The air bag 14 can alternatively be made from non-woven material, such as plastic film. The use of plastic film, in particular, would require inflation fluid vents to be formed in the air bag 14, as is known in the art. The material of the air bag 14 is substantially non-extensible. That is, the material of the air bag 14 does not stretch or elongate by more than a very small, insignificant, amount when subjected to load during assembly or actuation of the air bag module 10.

The air bag 14 has an interior surface 80 (FIG. 6) and an exterior surface 82. The interior surface 80 defines an inflation fluid volume 84 for receiving inflation fluid from the inflator 16 to move the air bag 14 from a folded and stored condition to the inflated condition. When the air bag 14 is inflated, the exterior surface 82 of the air bag is engageable by a vehicle occupant to help protect the vehicle occupant from striking or being struck by parts of the vehicle. The air bag 14 may include one or more tethers (not shown) for controlling the shape of the air bag when inflated.

The air bag 14 as illustrated is a "pillow-type" air bag made from similar front and back panels 86 and 88. Each of the front and back panels 86 and 88 is generally circular in configuration. The front and back panels 86 and 88 are sewn together along their outer peripheries as shown in FIGS. 3–6.

The front panel 86 of the air bag 14 includes a throat or mouth portion 90 (FIGS. 6 and 7) of the air bag 14. The mouth portion 90 of the air bag 14 includes an annular surface 92 (FIG. 7) which extends between the interior and exterior surfaces 80 and 82 and defines an inflation fluid opening 94 in the air bag. The inflation fluid opening 94 has a generally circular configuration, as shown in dash-dot lines in FIG. 3, when the front panel 86 is laid flat. The diameter of the inflation fluid opening 94 in this condition is less than the outer diameter of the retaining ring 22 and also less than the diameter of the central opening 72 in the retaining ring. A body portion 100 of the air bag 14 forms the remainder of the air bag and extends outward from the mouth portion 90 when the air bag is in the inflated condition.

In the process of assembling the air bag 14 with the retaining ring 22, the air bag is initially in an inverted or "inside-out" condition as shown in FIG. 3. That is, the interior surface 80 of the air bag 14 is exposed on the outside of the air bag. The inflation fluid opening 94 in the mouth portion 90 of the air bag 14 is in a circular configuration as shown in dot-dash lines in FIG. 3. Because the outer diameter of the retaining ring 22 is greater than the diameter of the inflation fluid opening 94 in the air bag 14, the inflation fluid opening in the air bag is too small, when circular, to permit movement of the retaining ring into the air bag. Therefore, to permit movement of the retaining ring 22 into the air bag 14, the mouth portion 90 of the air bag is deformed so that the inflation fluid opening 94 has a non-circular configuration as shown in solid lines in FIG. 3. In this configuration, the inflation fluid opening 94 has at least one dimension (indicated by the arrow 102) which is greater than the outer diameter of the retaining ring 22.

The retaining ring 22 is turned on edge, as seen in FIG. 3, and moved through the inflation fluid opening 94 into the air bag 14. The retaining ring 22 is inserted into the air bag 14 in a direction generally parallel to the plane of the retaining ring. The orientation and direction of movement of the retaining ring 22 make it possible for the retaining ring to pass through the inflation fluid opening 94 into the air bag 14.

After the retaining ring 22 is moved to a position inside the air bag 14, the mouth portion 90 of the air bag is returned to the condition shown in the dashed lines in FIG. 3. The retaining ring is moved to an orientation generally parallel to the mouth portion 90 of the air bag as shown in FIG. 4. The central opening 72 in the retaining ring 22 is aligned with and overlies the inflation fluid opening 94 in the air bag 14.

Figure 6:
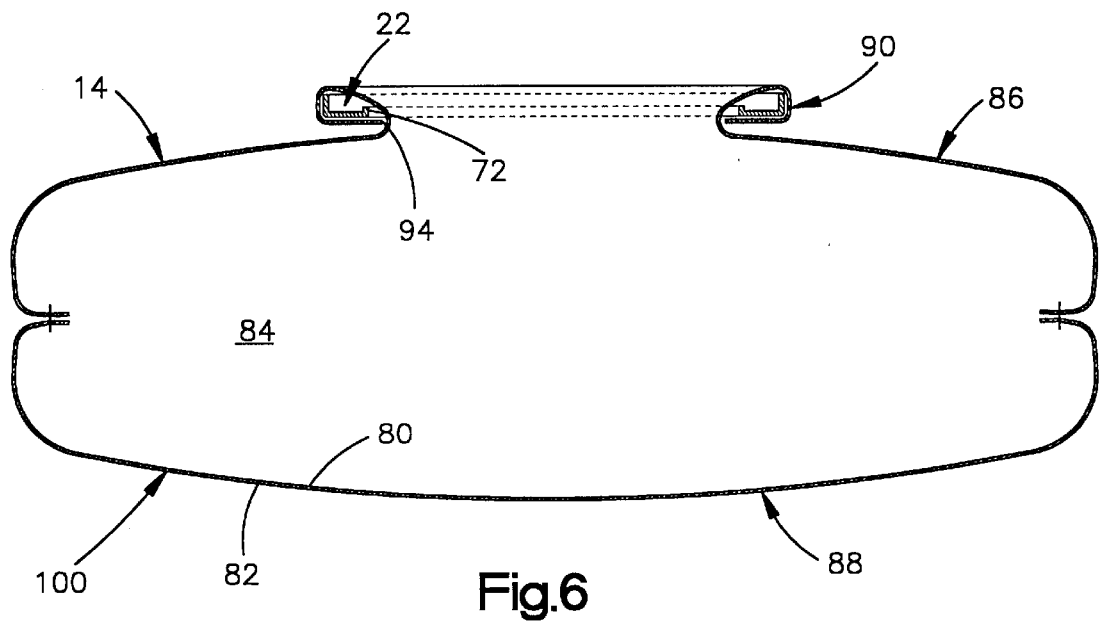
FIG. 6 is a view illustrating a further step in the process of assembling the air bag and retaining ring.

The air bag 14 is then inverted by pulling the body portion 100 of the air bag through the retaining ring 22 and through the mouth portion 90 of the air bag in a manner as shown in FIGS. 5 and 6. Specifically, the body portion 100 of the air bag 14 is moved through the central opening 72 in the retaining ring 22 and through the inflation fluid opening 94 in the air bag. As this occurs, the air bag 14 is inverted from the "inside-out" condition of FIGS. 3 and 4 and assumes a "right side out" condition as seen in FIG. 6 in which the exterior surface 82 is exposed on the outside of the air bag.

Figure 7:
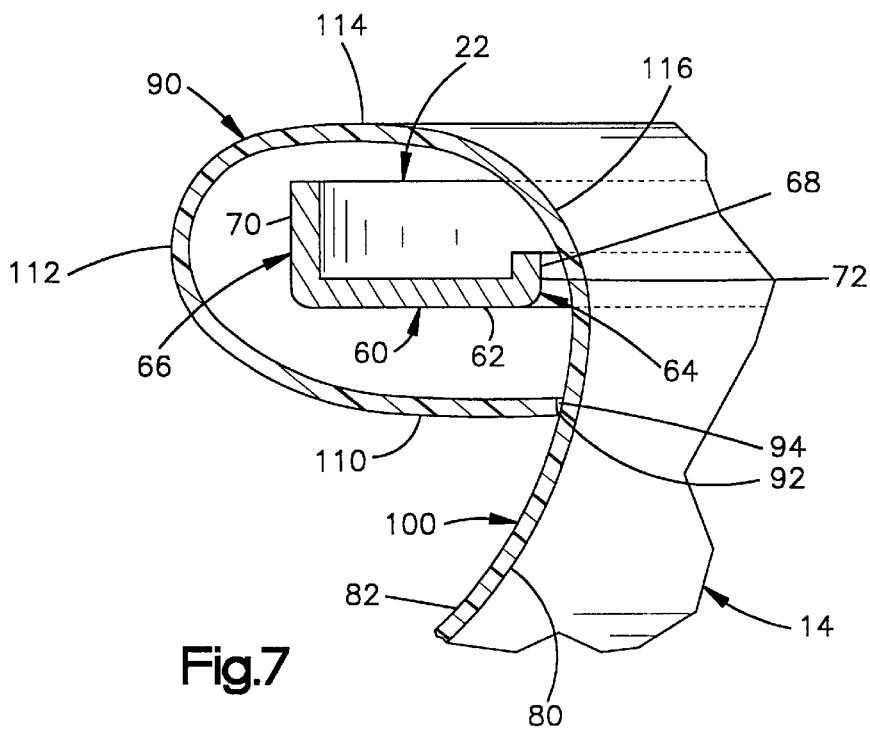
FIG. 7 is an enlarged view of a portion of the air bag and retaining ring.

As the air bag 14 is thus inverted, the mouth portion 90 of the air bag wraps around the retaining ring 22, as seen in FIGS. 6 and 7. A first section 110 (FIG. 7) of the mouth portion 90 of the air bag 14 extends away from the surface 92 defining the inflation fluid opening 94, along the outer side surface 62 of the body portion 60 of the retaining ring 22. A second section 112 of the mouth portion 90 of the air bag 14 extends from the first section 110, along and around the outer peripheral flange 66 of the retaining ring 22.

A third section 114 of the mouth portion 90 of the air bag 14 extends from the second section 112, in a direction generally parallel to the first section 110 and toward the central opening 72 in the retaining ring 22. A fourth section 116 of the mouth portion 90 of the air bag 14 extends from the third section 114, in a direction generally parallel to the second section 112, along and around the inner peripheral flange 64 of the retaining ring 22. The fourth section 116 extends through the central opening 72 in the retaining ring 22.

The mouth portion 90 of the air bag 14 merges with the body portion 100 of the air bag 14 at about the location of the inflation fluid opening 94. The body portion 100 of the air bag 14 extends through the inflation fluid opening 94 in the mouth portion 90 of the air bag, past the surface 92 defining the inflation fluid opening. The body portion 100 of the air bag 14 has a tubular configuration where it extends through the circular inflation fluid opening 94. The exterior surface 82 of the air bag 14 is presented toward the surface 92 which defines the inflation fluid opening 94. The mouth portion 90 of the air bag 14 does not overlie, and is not sewn to, either the mouth portion or the body portion 100 of the air bag.

When the air bag 14 and the retaining ring 22 are, thereafter, assembled in the module 10, the air bag is pulled tight around the retaining ring 22, as shown in FIG. 2. The clamp ring 24 is moved axially into a position clamping the inflator 16, the air bag 14, and the retaining ring 22 against the mounting plate 20. The clamp ring 24 is then rotated so that portions of the clamp ring are received under the mounting tabs 40 on the mounting plate 20. It should be understood that the inflator 16 and the air bag 14 and the retaining ring 22 could be secured to the mounting plate 20 in other manners.

The air bag 14 is secured by clamping between the retaining ring 22 and the mounting plate 20. Specifically, the first section 110 of the mouth portion 90 of the air bag 14 is in abutting engagement with the outer major side surface 62 of the body portion 60 of the retaining ring 22. The first section 110 of the mouth portion 90 of the air bag 14 is also in abutting engagement with the upper major side surface 34 of the mounting plate 20. The air bag 14 is also clamped between the inflator 16 and the retaining ring 22. Specifically, the third section 114 of the mouth portion 90 of the air bag 14 is clamped between the mounting flange 54 of the inflator 16 and the inner and outer flanges 64 and 66 of the retaining ring 22.

The air bag 14 is folded and stored adjacent to the inflator 16 in a known manner. In the event of vehicle deceleration above a predetermined threshold value, an electrical signal is provided over the lead wires 56 to the inflator 16. The inflator 16 is actuated in a known manner to direct inflation fluid under pressure from the outlets 52 into the air bag 14 to inflate the air bag. The inflation fluid flows through the inflation fluid opening 94 into the body portion 100 of the air bag 14. The air bag 14 inflates from the folded, stored condition to an inflated condition to help protect the vehicle occupant.

The outwardly inflating air bag 14 exerts a tensile force on the material of the body portion 100 of the air bag. This force is transmitted through the tubular portion of the air bag which extends through the inflation fluid opening 94, and into the fourth section 116 (FIG. 7) of the mouth portion 90 of the air bag 14. The force acts in a downward direction as viewed in FIGS. 2 and 7. This force is transmitted through the third and second sections 114 and 112 (FIG. 7) of the mouth portion 90 into the first section 110 of the mouth portion.

The first section 110 of the mouth portion 90 of the air bag 14 is pulled radially outward around the entire circumference of the mouth portion, effectively attempting to enlarge the inflation fluid opening 94. Because the material from which the mouth portion 90 of the air bag 14 is made is substantially non-extensible, the inflation fluid opening 94 in the air bag 14 does not enlarge substantially under the influence of this force. The retaining ring 22 can not slip through the inflation fluid opening 94. The mouth portion 90 of the air bag 14 remains wrapped around the retaining ring 22, and the force of the outwardly moving body portion 100 of the air bag acts to tighten the mouth portion of the air bag around the retaining ring. The air bag 14 is securely held in position on the mounting plate 20. No fasteners such as rivets or stitching sections are needed to prevent the air bag 14 from separating from the retaining ring 22.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle safety apparatus for use with an inflation fluid source, said apparatus comprising:

an inflatable vehicle occupant protection device having a mouth portion and having a body portion extending from said mouth portion, said mouth portion having a first opening;

a retaining ring for connecting said inflatable device with the inflation fluid source, said retaining ring having a second opening;

said inflatable device and said retaining ring having a first condition with said retaining ring disposed inside said inflatable device;

said inflatable device and said retaining ring having a second condition in which said body portion of said inflatable device is inverted and extends through the first opening in said mouth portion, said mouth portion being wrapped around said retaining ring and extending through the second opening in said retaining ring.

2. An apparatus as set forth in claim 1 wherein said mouth portion of said inflatable device includes a continuous surface defining and extending around the first opening in the mouth portion, said body portion having a tubular configuration extending through the first opening past said continuous surface.

3. An apparatus as set forth in claim 1 wherein said mouth portion of said inflatable device is made from a material which is substantially inextensible.

4. An apparatus as set forth in claim 1 wherein each one of the first and second openings is generally circular in configuration, the first opening having a diameter which is smaller than the outer diameter of the retaining ring.

5. An apparatus as set forth in claim 1 wherein said mouth portion does not overlie said body portion and said mouth portion is not sewn to said body portion or to said mouth portion.

6. An apparatus as set forth in claim 1 wherein said mouth portion of said inflatable device includes a first section extending along said retaining ring in a direction away from the first and second openings, a second section extending around an outer peripheral portion of said retaining ring, a third section extending along said retaining ring in a direction toward the first and second openings, and a fourth section extending around an inner peripheral portion of said retaining ring and merging with said body portion at about the location of the first opening in said inflatable device.

7. An apparatus as set forth in claim 1 wherein said mouth portion of said inflatable device is movable between a first configuration in which the first opening is small enough to block movement of said retaining ring through the first opening and a second configuration in which the first opening is large enough to enable movement of said retaining ring through the first opening to locate said retaining ring inside said inflatable device.

8. A vehicle safety apparatus for use with an inflation fluid source, said apparatus comprising:

an inflatable vehicle occupant protection device having a mouth portion and having a body portion extending from said mouth portion, said mouth portion having a first opening;

a retaining ring for connecting said inflatable device with the inflation fluid source, said retaining ring having a second opening;

said body portion of said inflatable device extending through the first opening in said mouth portion, said mouth portion of said inflatable device being wrapped around said retaining ring.

9. An apparatus as set forth in claim 8 wherein said inflatable device has an interior surface which defines an inflation fluid volume for receiving inflation fluid from said inflation fluid source, said inflatable device having an exterior surface opposite said interior surface and engageable by the vehicle occupant when said inflatable device is in an inflated condition, said mouth portion comprising a surface defining an inflation fluid opening extending between said interior surface of said inflatable device and said exterior surface of said inflatable device, said exterior surface being presented toward said surface where said body portion of said inflatable device extends through said inflation fluid opening.

10. An apparatus as set forth in claim 8 wherein said body portion of said inflatable device has a tubular configuration where said body portion extends through the first opening in said mouth portion, and wherein said mouth portion does not overlie said body portion and is not sewn to said body portion or to said mouth portion.

11. An apparatus as set forth in claim 8 wherein said mouth portion of said inflatable device is made from a material which is substantially inextensible, each one of the first and second openings being generally circular in configuration, the first opening having a diameter which is smaller than the outer diameter of said retaining ring.

12. A method of assembling a vehicle safety apparatus for use with an inflation fluid source, said method comprising the steps of:

providing an inflatable vehicle occupant protection device having a mouth portion and having a body portion connected with the mouth portion, the mouth portion of the inflatable device having a first opening;

providing a retaining ring for connecting the inflatable device with the inflation fluid source, the retaining ring having a second opening;

moving the retaining ring through the first opening from a position outside the inflatable device to a position inside the inflatable device; and inverting the body portion of the inflatable device by pulling the body portion through the first opening in the mouth portion, said inverting step including wrapping the mouth portion of the inflatable device around the retaining ring to extend through the second opening.

13. A method as set forth in claim 12 wherein said step of moving the retaining ring through the first opening includes the step of moving the mouth portion of the inflatable device between a first condition in which the first opening is small enough to block movement of the retaining ring through the first opening and a second condition in which the first opening is large enough to enable movement of the retaining ring through the first opening.

14. A method as set forth in claim 13 wherein said step of providing a retaining ring includes providing a retaining ring having a generally planar configuration, and wherein said step of moving the retaining ring through the first opening includes the step of moving the retaining ring through the first opening in a direction generally parallel to the plane of the retaining ring.

15. A method as set forth in claim 14 including the step of changing the orientation of the retaining ring after the retaining ring is moved through the first opening so that the retaining ring is generally parallel to the mouth portion.

16. A method as set forth in claim 12 wherein the mouth portion of the inflatable device includes a surface defining and extending around the first opening in the mouth portion, and wherein said step of wrapping the mouth portion of the inflatable device around the retaining ring includes extending the mouth portion of the inflatable device along a first major side surface of the retaining ring in a direction away from the first and second openings and thence around an outer peripheral portion of the retaining ring and thence along a second major side surface of the retaining ring and thence around an inner peripheral portion of the retaining ring and thence through the second opening to extend the body portion past the surface defining the first opening in the mouth portion.

* * * * *